United States Patent [19]
Kuroda et al.

[11] 3,800,119
[45] Mar. 26, 1974

[54] RESISTANCE WELDING MONITOR

[75] Inventors: Ichro Kuroda, Toyonaka; Hiroshi Asami, Osaka, both of Japan

[73] Assignee: Izumi Denki Company Limited, Osaka, Japan

[22] Filed: June 8, 1973

[21] Appl. No.: 368,541

Related U.S. Application Data

[63] Continuation of Ser. No. 187,663, Oct. 8, 1971, abandoned.

[30] Foreign Application Priority Data
Oct. 12, 1970 Japan.................................. 45-89943

[52] U.S. Cl. ................................................ 219/109
[51] Int. Cl. ............................................ B23k 11/24
[58] Field of Search............................. 219/109, 110

[56] References Cited
UNITED STATES PATENTS

| | | | |
|---|---|---|---|
| 3,422,243 | 1/1969 | Meyer................................. | 219/110 |
| 3,609,285 | 9/1971 | Scarpelli et al..................... | 219/109 |
| 3,586,815 | 6/1971 | Eijnsbergen et al................ | 219/110 |
| 2,440,962 | 5/1948 | Livingston......................... | 219/110 X |

Primary Examiner—J. V. Truhe
Attorney, Agent, or Firm—Elliott I. Pollock

[57] ABSTRACT

A resistance welding monitor comprises a half-wave amplifier for half-wave amplifying the voltage across the electrodes of a resistance welder at the time of welding, a memory circuit for storing the maximum value of the output waveform from the half-wave amplifier, and an operating circuit for calculating the output from the memory circuit on the basis of a predetermined constant in order to decide whether the welding operation is satisfactory or not. A comparator-detector circuit compares the output of the operating circuit with that of the half-wave amplifier to detect only a positive wave, and a delay circuit is provided for smoothing and delaying the output from the comparator-detector circuit. The output from the detector circuit is applied to a decision circuit which in turn develops an alarm pulse through a reference pulse generator circuit on receipt of the output from the half-wave amplifier, and the alarm pulse is passed on to actuate an alarm circuit only when the output from the delay circuit is applied to the operating circuit, thereby detecting an unsuccessful welding result, simplifying the welding operation under various welding conditions.

4 Claims, 7 Drawing Figures

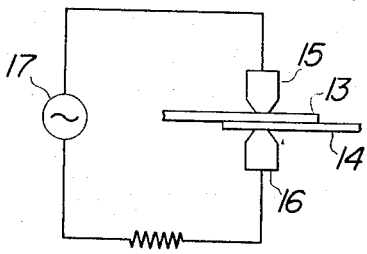
FIG. 1 PRIOR ART
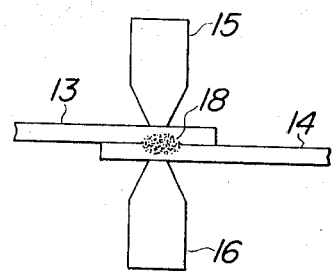
FIG. 2
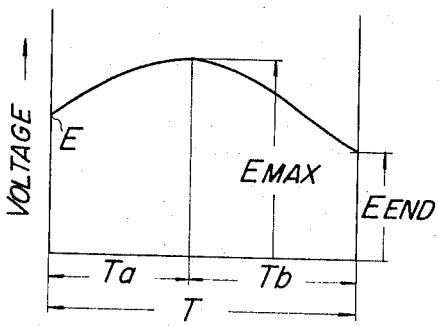
FIG. 3
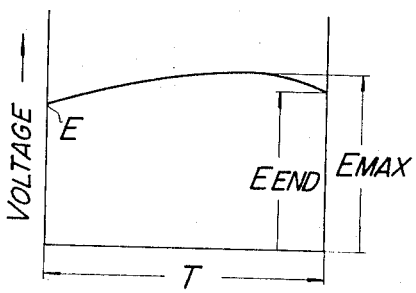
FIG. 4
FIG. 6
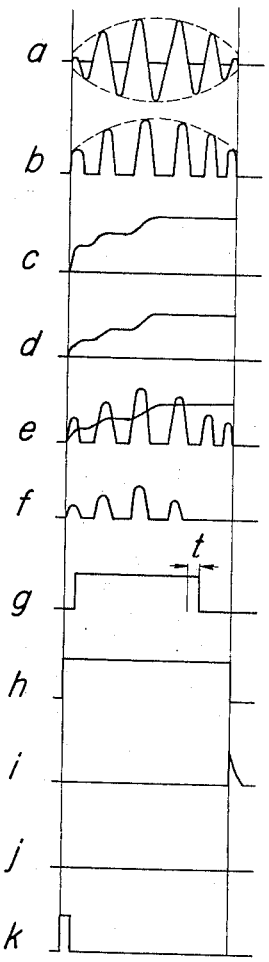
OUTPUT WAVE-
FORMS FROM
EACH CKT FOR
SATISFACTORY
WELDING JOB
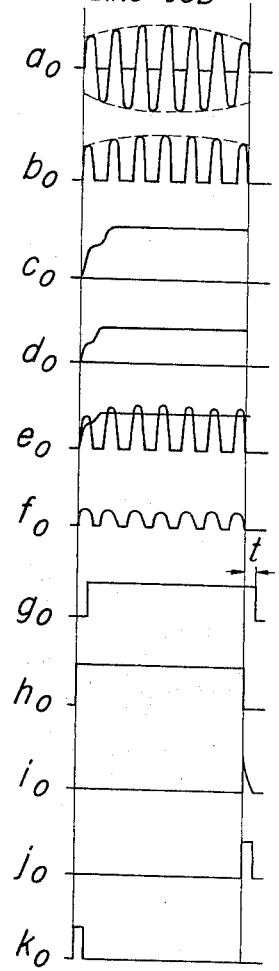
OUTPUT WAVE-
FORMS FROM
EACH CKT FOR
UNSATISFACTORY
WELDING JOB

RESISTANCE WELDING MONITOR

This is a continuation of application Ser. No. 187,633, now abandoned, filed Oct. 8, 1971.

FIELD OF THE INVENTION

This invention relates to a resistance welding monitor which automatically discovers whether or not a resistance welding such as a spot welding operation is being successfully performed and, if it is unsatisfactory, gives an alarm, thus achieving automatic detection thereof.

BRIEF DESCRIPTION OF THE DRAWINGS

FIG. 1 is a diagram illustrating a prior art spot welding arrangement.

FIG. 2 is an enlarged view of the welded portion.

FIGS. 3 and 4 are diagrams showing characteristic curves of the voltage between the electrodes of a welder during the welding processes, respectively, with FIG. 3 showing a successful welding operation, and FIG. 4 an unsuccessful one.

FIG. 6 is a diagram showing output waveforms of various component circuits of the embodiment of FIG. 5.

BACKGROUND OF THE INVENTION

Figure 5:
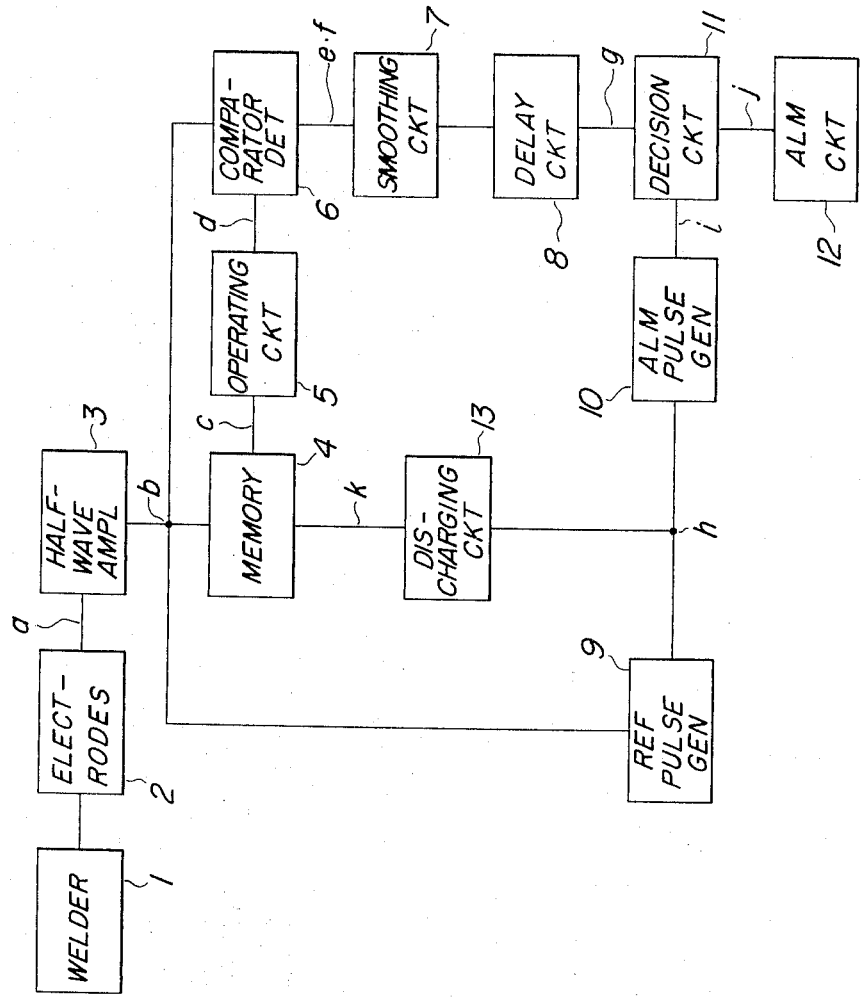
FIG. 5 is a block diagram showing an embodiment of the invention.

It is well known that to effect spot welding, two (or more) steel plates 13 and 14 are laid one on the other between a pair of electrodes 15 and 16 as shown in FIG. 1, and an AC voltage from the power supply 17 is applied across them. The current thus caused develops Joule heat due to the resistance of the overlapped portions of the iron plates 13 and 14 and the internal resistance thereof. As a result, a nugget 18 is developed in the overlapped portions, while the plates 13 and 14 are pressed by the electrodes thereby to form depressions at portions adjacent to the electrodes, as shown in FIG. 2. The plates 13 and 14 are, as a result, reduced in thickness at these portions and hence the electric resistance is further reduced. The nugget thus developed is cooled, thereby accomplishing the desired spot weld. Since successful spot welding depends upon the quality of the nugget 18, it is possible to see whether the welding operation is successfully conducted or not by monitoring the nugget 18 by some means.

SUMMARY OF THE INVENTION

An electric characteristic which reflects a successful spot welding operation with a nugget formed correctly is shown in FIG. 3. In this figure, the ordinate represents a voltage between the electrodes 15 and 16 of the welder and the abscissa represents the welding time T. When the voltage E is applied across the electrodes 15 and 16, a current which depends on the internal resistance of the steel plates 13 and 14 and the contact resistance between them flows to generate heat in the steel plates. In the initial stage specified by T$a$ when the steel plates are heated, the internal resistance of the steel plates or weld-spot increases so that the voltage across the electrodes rises gradually, while at the same time starting to form the nugget 18 in the region of contact between the steel plates 13 and 14. The nugget 18 expands to gradually lower the contact resistance, while the plates 13 and 14 are reduced in thickness at the portions adjacent to the electrodes due to the pressure thereof, resulting in a reduction of the whole resistance of the weld spot. The maximum voltage between the electrodes is indicated by Emax in the figure, while the voltage at the end of the period T$b$, from the time when the resistance begins to be reduced until the completion of welding or the period during which the nugget is formed, is shown by Eend. In the absence of nugget 18 or in the case of a smaller nugget 18 being formed, the voltage characteristic curve becomes almost linear as shown in FIG. 4. By observing the voltage waveform while current is flowing between the electrodes, it is possible to know how the nugget is formed. The ratio of voltage reduction between the electrodes from Emax to Eend is expressed as $$V = \text{Emax} - \text{Eend}/\text{Emax} \times 100 \text{ percent}$$

In accordance with the present invention, this value is measured and compared with a reference, making it possible to monitor the welding condition on the above-described principle. As an approximation, Emax/B may be compared with Eend, and if $$\text{Emax}/B > \text{Eend} \quad (1)$$

the welding operation is successful, while if $$\text{Emax}/B < \text{Eend} \quad (2)$$

it is considered unsatisfactory, without running counter to the above-described principle. In the above inequalities, B is a constant the value of which depends on the thickness of steel plates 13 and 14, applied voltage and other welding conditions.

To effect the foregoing method operation, the present invention provides a spot welding monitor employing an AC power supply and comprising a circuit which calculates Emax/B for comparision with Eend by storing Emax each time a welding operation occurs.

DESCRIPTION OF THE PREFERRED EMBODIMENT

Figure 7:
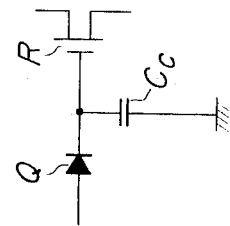
FIG. 7 is a diagram showing an example of the circuit for storing the maximum value of a voltage waveform employed in the invention.

An embodiment of the invention will be now explained with reference to FIGS. 5 to 7. The reference numeral 1 depicts a welder with a built-in timer for determining a welding time. Number 2 represents the electrodes of the welder having an output voltage waveform as shown by $a$ in FIG. 6, and numeral 3 is a half-wave amplifier with an output waveform shown by $b$ in FIG. 6. Numeral 4 is a memory circuit for storing the maximum value of the voltage waveform $b$, and consists of, for example, a diode Q, a capacitor Cc and a high input impedance amplifier R as illustrated in FIG. 7. The high input impedance of the amplifier R prevents the electric charges in the capacitor Cc from flowing toward the amplifier R. Also, since the charges in the capacitor Cc are prevented from being let off due to the reverse impedance of the diode Q, the maximum value of the output waveform $b$ of the half-wave amplifier 3 is stored. Therefore, the amplitude of the output of the memory circuit 4 is held at a peak value which has first occurred in the voltage waveform $b$ till a greater peak value occurs in the same waveform, at which time the amplitude is changed to the greater peak value and held there until a still greater peak value occurs. Thus, the memory circuit produces an output waveform as shown in FIG. 6 at c. Numeral 5 represents an operating circuit for calculating the value Emax/B as shown in the inequalities (1) and (2), and its output waveform is as shown in FIG. 6 at d. Numeral 6 represents a comparator-detector which makes a comparison between the output waveform b of the half-wave amplifier 3 and the output waveform d of the operating circuit 5 to detect a positive waveform satisfying the inequality $b > d$. Both of the waveforms are shown overlapped in e, while the detected positive waveform is indicated by f. Numeral 7 is a smoothing circuit for amplifying and smoothing the waveform f, and numeral 8 is a delay circuit, for delaying the output of the smoothing circuit 7, which produces an output waveform as shown by g, the delay time being represented by t. Numeral 9 is reference pulse generator circuit which amplifies, smoothes and shapes the waveform b to develop the rectangular wave h. Numeral 10 is an alarm pulse generator circuit which develops the pulse wave i at the fall time of the rectangular wave h. Numeral 11 is a decision circuit which passes the pulse wave i only when the wave g is applied to it. Numeral 12 is an alarm circuit which gives an alarm on receipt of the output from the decision circuit 11. Numeral 13 is a discharging circuit for discharging the charges of the previous measurement from the capacitor Cc of the memory circuit 4.

In FIG. 6, $a, b, \ldots k$ represent output waveforms for a successful welding operation, while $a_o, b_o, \ldots k_o$ represent those for an unsuccessful one. Referring to the former, the waveform developed between the electrodes 2 constitutes a curve (shown by a dotted line) with its peak occurring almost at its center, as shown by the waveform a. This waveform a is half-wave amplified by the half-wave amplifier 3 and passed through the memory circuit 4, shown in detail in FIG. 7, for storing the maximum value of the waveform thereby producing the waveform c. The waveform d which is obtained by processing the waveform c through the operating circuit 5 according to the formulae (1) and (2) is superposed on the output waveform b of the half-wave amplifier 3 and they are compared with each other by the comparator-detector circuit 6 comprising a differential amplifier or the like. From the resulting waveform e, only a positive waveform f is detected. The waveform f is amplified and smoothed by the smoothing circuit 7, and then it is delayed by the time t in the delay circuit 8, resulting in the waveform g. As will be described later, the delay time t is required only for an unsuccessful welding operation. The output g of the delay circuit 8 is applied to the decision circuit 11. On the other hand, the output waveform b of the half-wave amplifier 3 is transformed into a rectangular wave h by the reference pulse generator circuit 9. The rectangular waveform h is accompanied by a pulse i at the fall time thereof by means of the alarm pulse generator circuit 10, which pulse is applied to the decision circuit 11. The decision circuit 11 is such that it passes the pulse i only when the waveform g is applied to it. When the welding operation is being successfully performed, the waveform g is eliminated before the pulse i is applied to the decision circuit 11, and therefore the alarm circuit 12 at the rear part of the decision circuit 11 is not energized.

When the welding operation is unsatisfactory, the envelope of the waveform of the voltage between the welder electrodes 2 is almost linear as shown by $a_o$. This wave $a_o$ is applied to the comparator-detector circuit 6 through the half-wave amplifier 3, memory circuit 4 and operating circuit 5, while the output waveform $b_o$ of the half-wave amplifier 3 is applied to the comparator-detector circuit 6. Both of the waveforms are superposed and compared with each other, producing the waveform $e_o$, from which a positive portion is detected as the waveform $f_o$. The waveform $f_o$ is applied through the smoothing circuit 7 to the delay circuit 8 to obtain the waveform $g_o$. Since the pulse waveform $i_o$ from the alarm pulse generator circuit 10 is applied to the decision circuit 11 while the waveform $g_o$ is applied to the decision circuit 11, the decision circuit 11 allows the pulse $i_o$ to pass through it and produces the output $j_o$, energizing the alarm circuit 12. In this way, the alarm circuit 12 is energized only when the welding operation is unsatisfactory, thus automatically informing the operator of the unsatisfactory welding condition.

It will be understood from the above explanation that, according to the invention, the formation of a nugget in a resistance welding operation such as spot welding is detected in the form of a voltage wave, the maximum value of which is stored and calculated for comparison with a reference, thus automatically detecting the unsuccessful welding operation and energizing an alarm circuit to inform the operator of it. Unlike the conventional devices of this kind in which a reference voltage for a satisfactory welding job is set manually, the device of the present invention permits automatic setting of a reference for each welding job. This not only simplifies the welding operation but also eliminates the need for resetting the reference under different welding conditions or for various thicknesses of plates to be welded. Further, there is no error in setting the reference.

We claim:

1. A resistance welding monitor for determining the welding quality in a resistance welding operation performed by a welding apparatus of the type comprising a pair of welding electrodes, an AC power source connected across said electrodes for energizing said electrodes to perform a welding operation, and a timer for setting a predetermined period of time in which to perform said welding operation, said monitor comprising: half-wave circuit means connected to said AC energized welding electrodes for producing a first voltage signal corresponding to predetermined polarity half-cycles of the welding voltage across said electrodes during said predetermined welding period of time, a peak-detecting storage circuit connected to said half-wave circuit means for continually monitoring the amplitude of said first voltage signal during said predetermined welding period of time and having means operative to store the maximum value only of said first voltage signal while discarding other lesser voltage values of said first signal, an operating circuit coupled to said storage circuit, said operating circuit having means therein for setting a predetermined constant value which is dependent on preselected welding parameters, said operating circuit being operative to produce a second voltage signal of said predetermined polarity constituting a reference signal whose amplitude at each instant of time is a joint function of the maximum voltage value which has appeared in said first voltage signal until said instant and of said predetermined constant value, comparator means coupled to said half-wave circuit means and to said operating circuit for comparing said first voltage signal with said second voltage signal in point-to-point time relation and operative to produce a third voltage signal at its output corresponding to the predetermined polarity portions of said first voltage signal which exceed said second voltage signal in magnitude, circuit means connected to the output of said comparator means for smoothing and delaying said third voltage signal for a predetermined time interval thereby to produce a fourth voltage signal, and alarm circuit means connected to said smoothing and delaying circuit means for producing an alarm signal when said fourth signal is present at the end of said welding period of time.

2. The monitor of claim 1 wherein said predetermined polarity is the positive polarity.

3. The resistance welding monitor of claim 1 wherein said peak-detecting storage circuit comprises a memory circuit responsive to said first voltage signal for storing said maximum value and operative to produce a voltage signal whose amplitude changes so as to follow changes in said stored value, said memory circuit including a diode having said first voltage signal applied to one electrode thereof, a storage capacitor having one side thereof connected to the other electrode of said diode and its other side connected to a point of fixed potential, and a high input impedance amplifier having its input connected across said storage capacitor.

4. A resistance welding monitor according to claim 1 wherein said alarm circuit means comprises pulse generating means responsive to said first voltage signal for producing an alarm pulse at the end point of said first voltage signal, and a decision circuit connected to said pulse generating means and to said smoothing and delaying circuit means for permitting said alarm pulse to pass through said decision circuit to an alarm circuit upon receiving said alarm pulse and said fourth voltage signal simultaneously.

* * * * *